United States Patent [19]

Moreau et al.

[11] 4,308,527
[45] Dec. 29, 1981

[54] INSTRUMENT PANEL DISPLAY

[75] Inventors: Michel L. Moreau, Chartres; Michel Harmand, Meudon-la-Foret, both of France

[73] Assignees: Societe Anonyme Automobiles Citroen; Automobiles Peugeot, both of Paris, France

[21] Appl. No.: 60,506

[22] Filed: Oct. 10, 1979

[30] Foreign Application Priority Data

May 22, 1979 [FR] France ............................... 79 13011

[51] Int. Cl.³ .............................................. G08B 5/36
[52] U.S. Cl. ........................... 340/366 D; 340/286 R; 340/378.1; 340/378.2
[58] Field of Search ............... 340/52 R, 378.1, 378.2, 340/753, 286 R, 366 D, 52 F; 362/23

[56] References Cited

U.S. PATENT DOCUMENTS 4,190,832 2/1980 Mohler ................................ 340/705

Primary Examiner—Harold I. Pitts
Attorney, Agent, or Firm—Brisebois & Kruger

[57] ABSTRACT

Instrument panel including means for displaying the speed of the vehicle consisting of basically horizontal, superimposed scales. The scales are activated at particular ranges of speeds so that at higher speeds the activated scale is higher in the driver's field of vision. The length of the speed display scales is essentially inversely proportional to their height in the driver's field of vision.

15 Claims, 7 Drawing Figures

INSTRUMENT PANEL DISPLAY

SUMMARY OF THE INVENTION

The invention relates to an automobile instrument panel on which are grouped display means for displaying all the operating parameters of the vehicle to the driver and particularly the speed of the vehicle.

An object of the present invention is the realization of an instrument panel permitting all the information which is essential to driving safety and comfort to be so grouped as to focus the driver's attention particularly on the speed of the vehicle with respect to external conditions, and especially on the amount of permissable speed remaining at his disposition.

It is known to display the speed, at least for part of the range of speeds, on basically horizontal, superimposed scales, each scale located higher up in the driver's field of vision being activated at particular higher ranges of speeds.

According to the invention, an instrument panel of the type in question is characterized by the fact that the width of the speed display scales is basically inversely proportional to the height they occupy in the driver's field of vision.

According to another characteristic of the invention, provision is also made for indicating speeds above a given value, which is preferably the maximum value which can be displayed on the horizontal scale highest in the driver's field of vision, in the form of a fixed numerical display located at the top of the display.

It is still more useful if the numerical display of speeds above this given value is done inside a triangle similar to that symbolizing a distress or emergency signal, this geometric form also evoking the idea of peak speed.

An instrument panel conforming to the invention is especially well adapted to the use of various modern analog or digital display means using tubes and electroluminescent materials or liquid crystals.

The description of one embodiment follows, with reference to the attached drawings.

Figure 1:
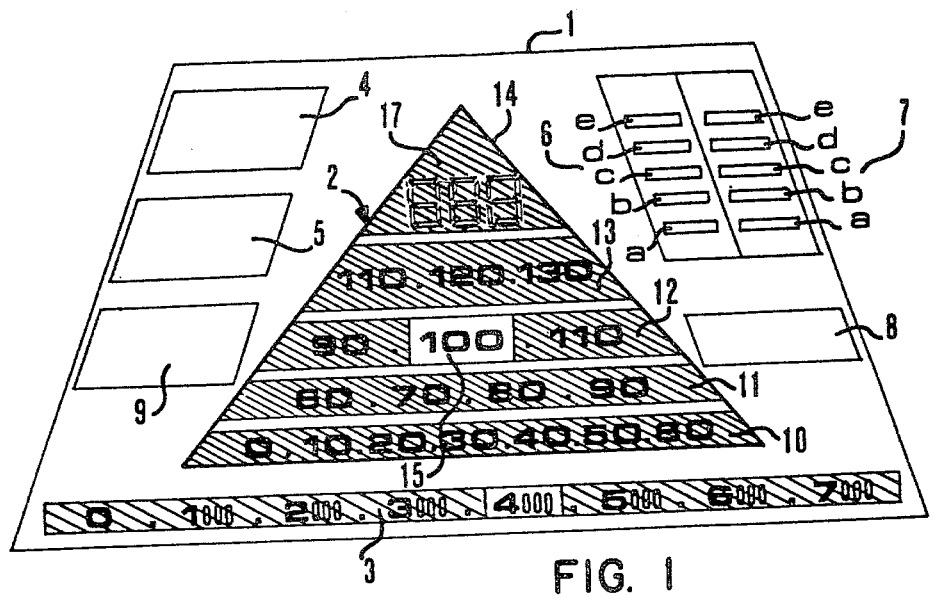
FIG. 1 is a plan view of the surface of the instrument panel or dashboard display as seen by the driver.

The general display zone, seen by the driver, is shown in FIG. 1. The information given by the instrument panel is seen through a translucent plate 1. Plate 1 is shaped like an isoceles trapezoid whose bases are horizontal. A triangular zone 2 for displaying speeds is positioned in the center of the trapezoid. Zone 2 is preferably an isoceles triangle placed symmetrically with respect to the axis of symmetry of the trapezoid, the peak of this triangle pointing toward the height of the driver's field of vision.

The other display zones surround zone 2. They include a tachometer 3 with a linear display disposed along one of the bases of the trapezoid, a kilometric odometer 4, a clock 5 with numerical display, a fuel gauge 6 and an oil gauge 7, as well as zones 8 and 9 in which warning and control signals are disposed.

The inscriptions or indicia showing on plate 1 such as the numerals or the outlines of the display zones are printed on the back of plate 1, for example by means of black silk-screening. These inscriptions are visible either by natural light or by transparence by means of auxiliary lighting placed behind plate 1.

Zone 2 is divided into four horizontal scales 10, 11, 12 and 13 and a triangle 14 disposed at the summit. Scales 10 to 13 consist of bands each of increasing height limited at each end by the sides of the triangle defining zone 2. The length of scales 10 to 13 thus is basically inversely proportional to the height they occupy in zone 2.

Each scale 10 to 13 corresponds to a range of speeds. The indication of increased speeds is from left to right and from bottom to top.

Scale 10 corresponds to urban speeds (less than or equal to 60 Km/hr), scale 11 to normal road speeds (less than or equal to 90 Km/hr.), scale 12 to divided express highway speeds (less than or equal to 110 Km/hr.) and scale 13 to autoroute or turnpike speeds (less than or equal to 130 Km/hr). Each scale begins at the maximum speed indicated of the next lower scale. Of course, these numerical values could be adapted to different speed laws. It should also be noted that the height of the respective scales increases with the speed.

The driver thus has the combination of the three following criteria, in addition to the speed indication, to identify each range of speeds: height of the corresponding scale in his field of vision, and height and width of each scale.

To further facilitate the identification of different ranges of speeds and to still better direct the attention of the driver to high speeds, it is useful for each scale to be of a different color, going, for example, from green for scale 10 to red for scale 13, scales 11 and 12 being respectively yellow and orange.

In operation, the zone corresponding to the vehicle's speed is locally more brightly lit for example in the usual fashion by using electroluminescent elements forming a moveable or changeable luminous surface 15 placed behind translucent plate 1.

Figure 2:
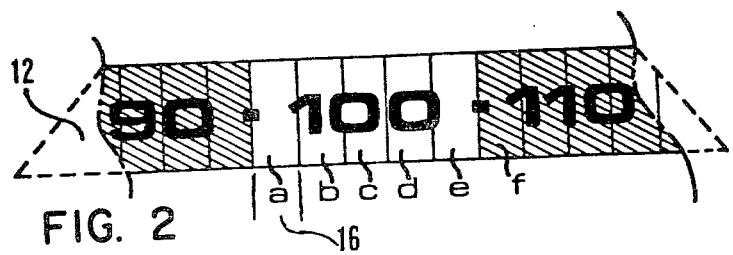
FIG. 2 is an enlarged detail showing one embodiment of a display scale corresponding to a range of speeds.

This in FIG. 2, where an enlarged section of speed scale 12 is shown, segments 16 are identical electroluminescent elements aligned behind plate 1 along scale 12.

The width of each of segments 16 corresponds to a variation in speed of 2 Km/hr. Five contiguous segments are simultaneously excited or energized and so illuminated, the central segment corresponding to the actual speed.

For example, for a speed of 100 Km/hr., segments 16a, 16b, 16c, 16d, 16e are excited; if the speed increases 2 Km/hr. segment 16a is no longer excited while segment 16f becomes excited. This purpose is served by a moveable luminous surface 15 which moves step by step as a function of the speed.

In a similar fashion liquid crystals which become opaque when excited could be used as segments 16, in which case the segments corresponding to the displayed speed would not be excited and would allow the passage of light from illumination located generally behind translucent plate 1.

In one variation (not shown), instead of using a luminous moveable surface for lighting the speed display scales by transparence, the numerals and the intermediate gradations could themselves be electroluminescent material.

Inside triangle 14, one of whose sides is horizontal and the opposite summit of which is the highest point of zone 2, is arranged a numerical speed display device 17. Device 17 displays speeds above the maximum speed of scale 13, in this instance, higher than 130 Km/hr.

The dimensions of the numerals of device 17 are clearly larger than those of the numerals of horizontal scales 10 to 13. Device 17 can use any known type of numerical display, for example, electroluminescent tubes or liquid crystals; it includes three digits each consisting, in the usual way, of seven segments.

It will be noted that the width of the speed display zone diminishes but becomes higher in the field of vision of the driver as the indicated speed increases. This focuses the driver's attention on the consequent reduction in the margin of permissable speed left at his disposal which disappears when the speed reaches the values shown on device 17 whose triangular shape resembles the usual distress signal sign as well as the idea of peak speed.

The jump of luminous mobile surface 15 from one scale to the next draws the attention of the driver to an increase in speed beyond an intermediate value limit, for example 60 Km/Hr. in an urban zone.

This effect can be emphasized by the simultaneous presence of two luminous surfaces at the moment when the speed limit is passed, one on the right on the lower scale and the other on the left on the next higher scale.

Figure 3:
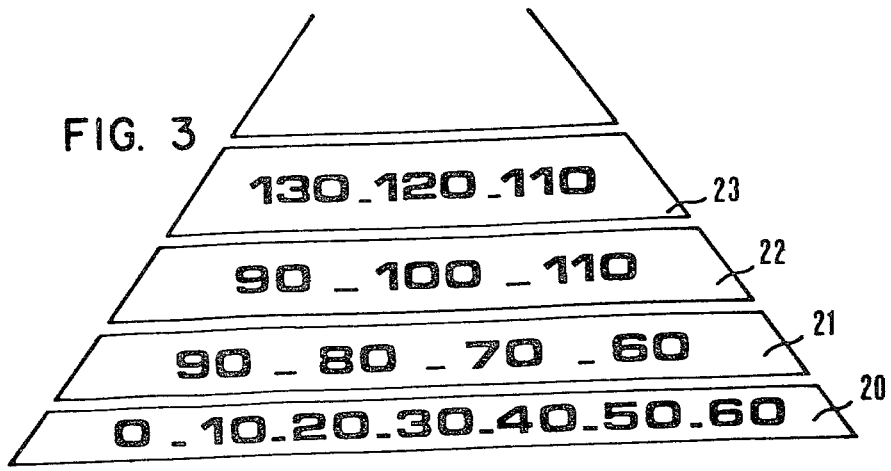
FIG. 3 is a variation of the speed display means shown in FIG. 1.

FIG. 3 shows a variation in the speed display means in which, for each range of speed corresponding to scales 20, 21, 22 or 23 which are basically horizontal, the display moves in the opposite direction from that of the display of the scales immediately below or above for the same sense of change of speed.

Figure 4:
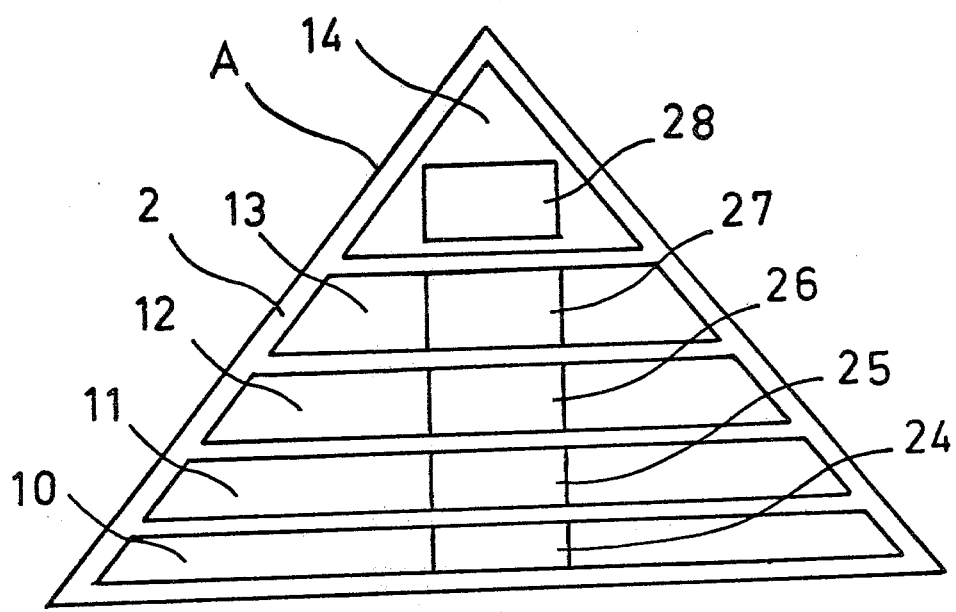
FIG. 4 shows another embodiment of the speed display.

FIG. 4 shows another means of displaying speeds in which the information is confined to and develops successively at a single fixed location of each superimposed scale, each of the scales being basically constituted by a band containing the spot the specific color of this scale extending all along the band.

Figure 6:
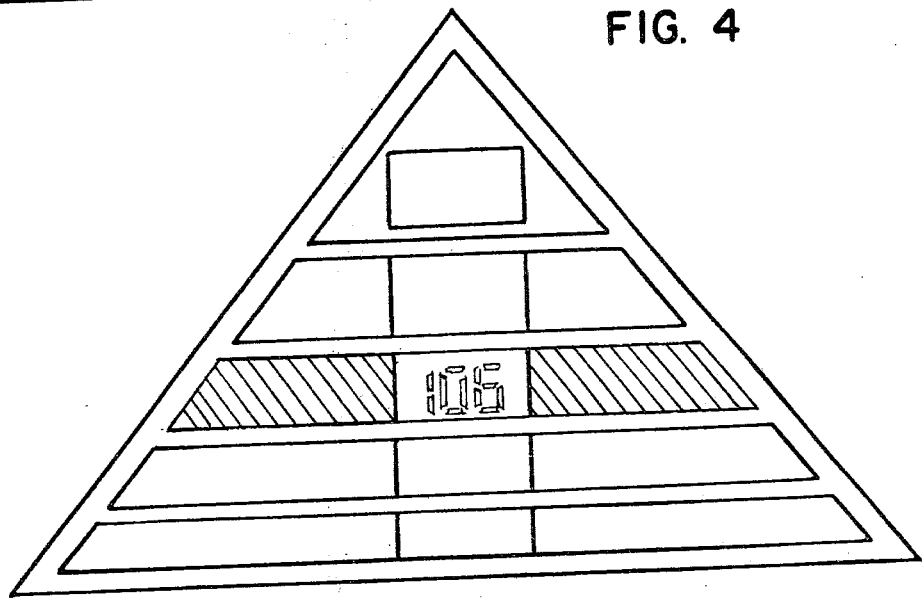
FIGS. 6 and 7 show the display of particular information in the respective embodiments of FIGS. 4 and 5.
Figure 7:
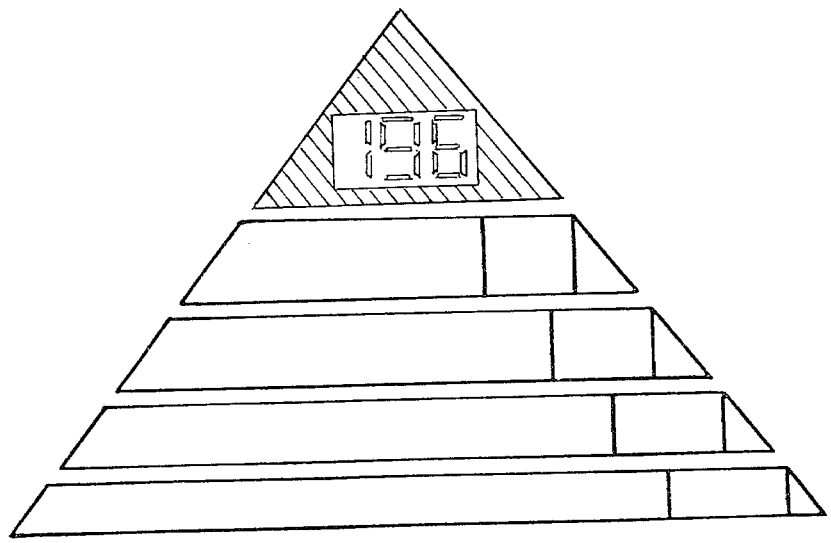

A first embodiment (FIG. 4) shows a central display with the displays vertically aligned, while a variation (FIG. 5) shows the displays offset to the side and progressing parallel to one of the edges of the perimeter defining the zone of information. FIGS. 6 and 7 show the appearance of particular speed information on the respective displays of FIGS. 4 and 5.

The first embodiment (FIG. 4) constitutes a triangular casing A which consists essentially of a display zone 2 of the same shape divided into several superimposed horizontal bands 10, 11, 12, 13 and a peak zone 14.

In the central area of each of these bands 10, 11, 12, 13 are placed respectively display areas 24, 25, 26, 27 superimposed and forming a vertical column each area segment of which is successively the location for information corresponding to the range of speeds of each sequence, an apex spot 28 showing inside zone 14 and being reserved for warning information or indication of speeds above a given value.

The principle of variations in display colors and the procedures for visualization already mentioned remain the same and the specific color of the information appearing at the level of the excited display area is reproduced and extends all along the band containing the area during the period corresponding to the display of the predetermined range of speeds for that scale.

FIG. 6 illustrates the display for an intermediate speed range.

Figure 5:
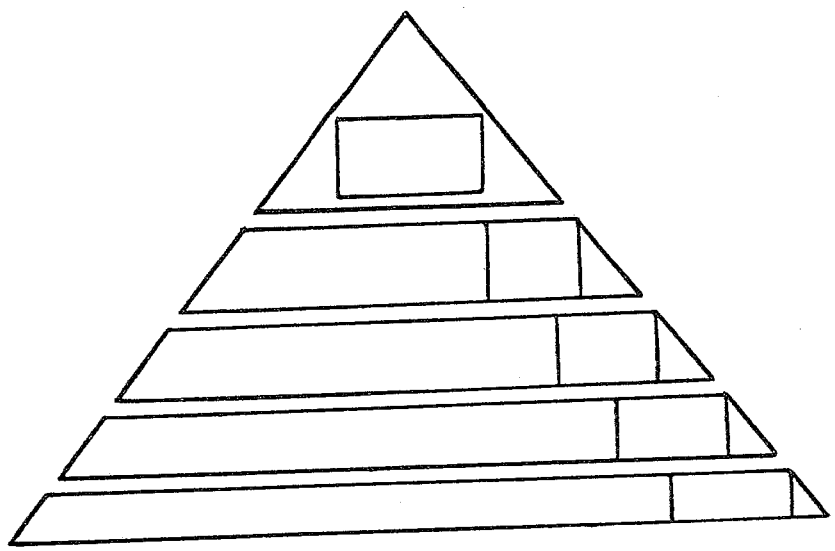
FIG. 5 shows a variation of the display of FIG. 4.

Another embodiment which is the object of FIG. 5 concerns a display device placed along one of the sides of triangular screen 2. In this embodiment the information is shown according to the same mode of synchronization of displays and their colors related to the level of the lateral bands. FIG. 7 being an operational example for a display corresponding to a particular range of speeds as described above.

The display means for revolution indicator or tachometer 3 are similar to those used for the display scales for speed. These means involve either a luminous mobile surface which moves as a function of engine rpm, or a luminous segment whose length is proportional to engine rpm.

Gauges 6 and 7 consist of superimposed horizontal segments 6a, 6b, 6c, 6d, 6e and 7a, 7b, 7c, 7d, 7e also of electroluminescent materials, electroluminescent tubes or liquid crystals.

They provide an analog representation of the measured level.

Of course many modifications may be made in the instrument panel or dashboard display as described and shown without departing from the scope of the invention. For example the scale on which the actual speed is displayed could be more brightly lit than the other scales.

What is claimed is:

1. A motor vehicle dashboard display comprising means for indicating a plurality of operating parameters of the vehicle to a driver of the vehicle; and vehicle speed indicating means for numerically indicating speeds and comprising, a plurality of essentially horizontal vertically spaced speed indicating scales on said display at a location to be viewed by the driver, said plurality of scales comprising a lowermost scale, an upper scale vertically spaced above the lowermost scale, and at least one intermediate scale between said upper and lowermost scales, said lowermost scale indicating only relatively slow vehicle speeds, said intermediate scale indicating only intermediate speeds of the vehicle, and said upper scale indicating high speeds of the vehicle, said lowermost having a length greater than said intermediate scale, and said intermediate scale having a length greater than said upper scale, the respective lengths of said scales being essentially inversely proportional to their respective vertical position, so that as the speed of the vehicle increases the speed is indicated at a higher location in the field of vision of the driver.

2. A display according to claim 1 wherein on each of said scales, the indicated speed displayed traverses its scale from left to right as the speed increases.

3. A display according to claim 1 wherein, as the speed increases, the indicated speed on the lowermost scale traverses the scale in a first horizontal direction, the indicated speed on the intermediate scale traverses the scale in a second horizontal direction opposite to the first direction; and the indicated speed on the upper scale traverses the scale in a direction opposed to the direction of traverse on the scale immediately below it.

4. A display according to any one of claims 1 to 3 further comprising, at a location vertically above said upper scale, stationary numerical display means for displaying speeds higher than the speeds indicated on said upper scale.

5. A display according to claim 4 wherein said stationary numerical display means comprises numerals of a size substantially larger than numerals of any of said horizontal scales.

6. A display according to claim 5 wherein said numeral of said stationary display means are displayed with an upright triangular display region at the uppermost portion of said speed indicating means.

7. A display according to claim 6 wherein said vehicle speed indicating means is wholly within a display region composed of an upright triangle.

8. A display according to claim 1 wherein each horizontal scale comprises an illuminated surface traversable along the scale.

9. A display according to claim 1 wherein the speed on each of said scales is indicated by numerals at a single fixed position on each scale.

10. A display according to claim 9 wherein said single fixed position on each scale is the center of the scale, and said positions are vertically aligned in the display.

11. A display according to claim 9 wherein said single fixed position on each scale is at a common side of the respective scales.

12. A display according to any one of claims 1 to 3 wherein, said speed indicating means comprises segments of electroluminescent material extending along each scale.

13. A display according to claim 1 wherein each scale is a different color from the other scales.

14. A display according to claim 1 wherein said entire display is contained in a trapezoidal region, the center portion of which comprises said speed indicating means, and said means for indicating the plurality of parameters comprises, a plurality of indicators positioned between said speed indicating means and sides of said trapezoidal region.

15. A display according to claim 1 further comprising horizontal scale means for indicating the speed of the motor of the vehicle.

* * * * *